June 12, 1934.                A. BALDARE                1,962,978
BASEMENT DRAIN
Filed Aug. 25, 1933
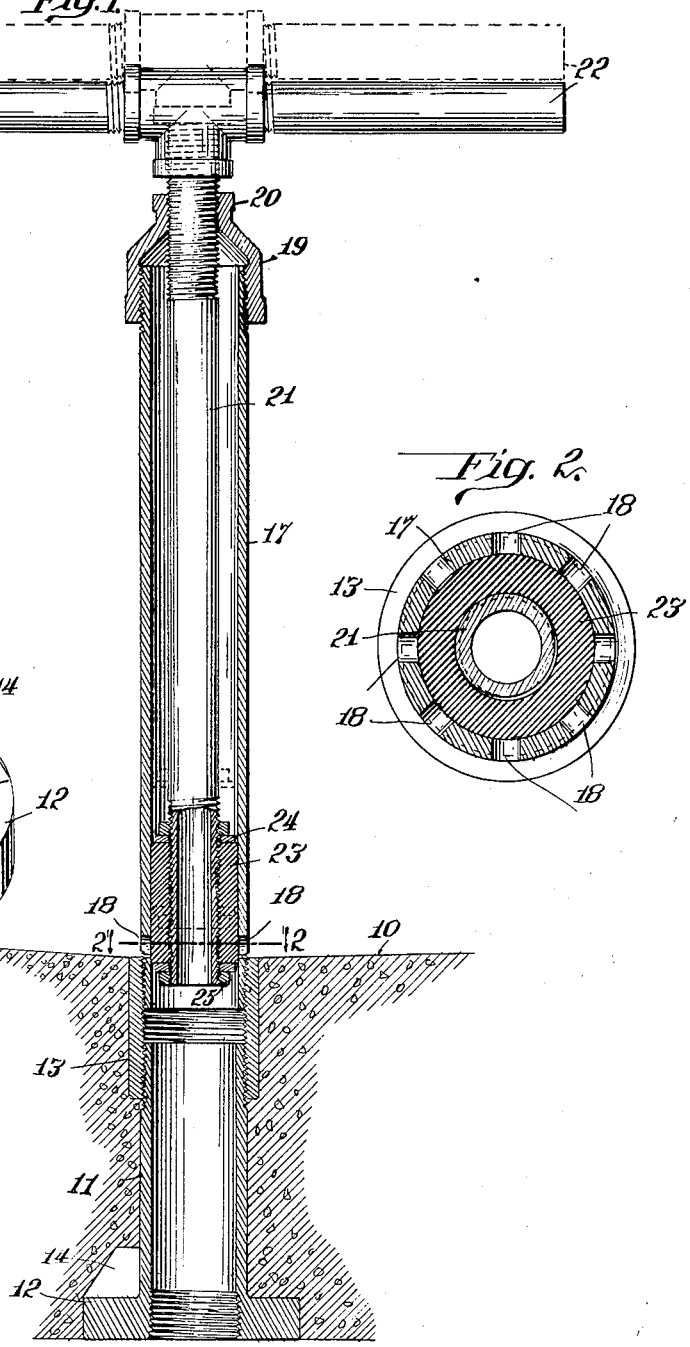
Inventor
Angelo Baldare
By Ernest E. Tupes
Attorney Patented June 12, 1934

1,962,978

UNITED STATES PATENT OFFICE 1,962,978

BASEMENT DRAIN

Angelo Baldare, Chicago, Ill.

Application August 25, 1933, Serial No. 686,800

4 Claims. (Cl. 182—31)

My invention relates to cellar or basement drains and closure means therefor.

An object of the invention is the provision of an improved drain of the kind described providing a sewer outlet for waste water and an improved valve means operable to prevent ingress of sewer gas and back flow of water from the sewer into the basement.

Another object of the invention is the provision of a flush drain and closure means therefor which is simple, compact, durable, economical of construction, easily installed and satisfactory for its intended purpose.

Many other objects and advantages of the construction herein shown and described will be obvious to those skilled in the art from the disclosure herein given.

To this end, my invention consists in the novel construction, arrangement and combination of parts herein shown and described and more particularly pointed out in the claims.

In the drawing, wherein like reference characters indicate like or corresponding parts:

Fig. 1 is an elevational view partly in section of an installation of the device;

Fig. 2 is a section on line 2—2 of Fig. 1; and

Fig. 3 is a perspective view of a portion of the drain.

Referring now more particularly to the drawing, the numeral 10 designates a section of a basement floor preferably constructed of concrete or other material impervious to water. The surface of the floor is shown as inclined towards the drain to permit water to flow through a vertical pipe section 11 embedded in the floor and having a collar 12 preferably integrally formed on its end and internally threaded for connection with a pipe (not shown) providing an outlet to a sewer. A sleeve 13 threaded on the upper end of the pipe 11 terminates flush with or slightly below the surface of the floor adjacent the drain. The collar 12 on the lower end of the pipe section 11 is so positioned as to be embedded in the floor and thereby provides a fixed and permanent mounting for the drain. Lugs 14 add strength and rigidity to the connection of the pipe section 11 with the collar 12.

A tubular member 17 provides a mounting for a valve operable to close the pipe 11 to the flow of fluid therethrough. The lower end of the tubular member 17 is threaded into the sleeve 13 and has a plurality of apertures 18 in its walls just above the level of the adjacent surface of the floor. The member 17 may be of any desired length and has its upper end threaded to receive a cap member 19. The member 19 converges upwardly and terminates in an internally threaded annular flange 20.

A shaft 21, positioned in the tubular member 17, provides a valve stem projecting through and having a threaded connection with the flange 20. The lower end of the shaft or stem 21 provides a mounting for a valve body which is movable vertically to open and close the apertures 18. The stem 21 may be rotated by means of a handle 22 to raise or lower the valve body by reason of the threaded connection of the stem with the flange 20. The valve body comprises a cylindrical packing member 23 closely fitting and sealing the annular space between the stem 21 and the tubular member 17. The cylindrical member 23 may be constructed of any suitable valve material which is impervious to moisture and air and is held in position on the stem 21 by upper and lower collars 24 and 25, respectively. The collars 24 and 25 have a threaded engagement with the stem 21 and are thereby adjustable to maintain the member 23 in close fitting cooperation with the stem 21 and the tubular member 17.

When it is desired to close the drain to prevent ingress of gas from the sewer or back flow of water therefrom, the valve body is moved to the full line position of Fig. 1 in which position, the apertures are effectively sealed. In the dotted line position of the valve, water can readily flow from the surface of the floor 10 into the drain 11 and thereby reach the sewer.

Thus, it will be seen that I have provided a novel and simple basement drain and closure means therefor which is easily operable to open or close the drain as described.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to cover by Letters Patent is:

1. A basement drain comprising a vertical conduit extending through the basement floor with its lower end adapted for connection with a sewer outlet, the upper end of said conduit projecting above the basement floor and providing a plurality of apertures just above the level of said floor, a valve body movable in and forming a fluid tight fit with the conduit adjacent said apertures, and means operable to move the valve body to close said conduit below said apertures.

2. A basement drain comprising a pipe section extending through the basement floor with its lower end providing a collar and means adapted for connecting the pipe section with a sewer outlet, a second pipe section forming an extension of the first section above the basement floor, said second pipe section providing a plurality of apertures just above the level of the floor, a valve body forming a fluid tight closure for the second pipe section, and means operable to move the valve body in said second pipe section to close and open said apertures.

3. A basement drain comprising a vertical conduit extending through the basement floor with its lower end adapted for connection with a sewer outlet, the upper end of said conduit projecting above the basement floor and providing a plurality of apertures just above the level of said floor, a valve body movable in and forming a fluid tight fit with the conduit adjacent said apertures, a valve stem on which the valve body is fixedly mounted, a cap member closing the upper end of the conduit, said stem projecting through said cap member and having a threaded connection therewith, and a handle member operable to rotate said valve stem and body to raise and lower said body to positions wherein said apertures are respectively opened and closed.

4. A basement drain comprising a vertical pipe section extending through the basement floor with its lower end providing a collar and means adapted for connecting the pipe section with a sewer outlet, a second pipe section connected with the first section and projecting above the basement floor, said second section providing a plurality of apertures just above the level of said floor, a valve body forming a fluid tight closure for the second pipe section, a valve stem on which the valve body is fixedly mounted, a cap member closing the upper end of the pipe, said stem projecting through said cap member and having a threaded connection therewith, and a handle member operable to rotate said valve stem and body to raise and lower the body to open and close the apertures.

ANGELO BALDARE.